Patented Dec. 6, 1949

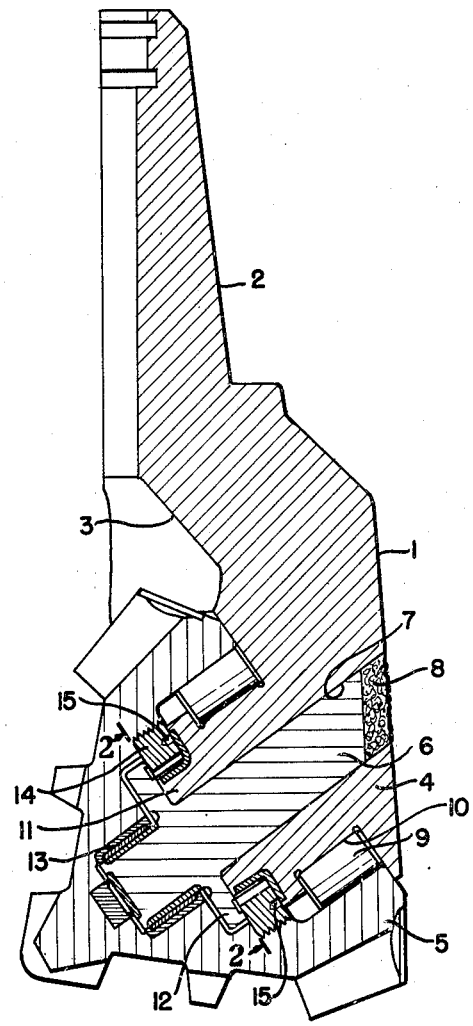
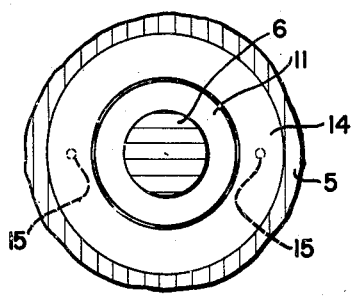

2,490,151

UNITED STATES PATENT OFFICE 2,490,151

DRILL BIT

Wiley B. Noble and Walter C. Francis, Houston, Tex., assignors to Reed Roller Bit Company, Houston, Tex., a corporation of Texas Application September 27, 1946, Serial No. 699,824

2 Claims. (Cl. 255—71)

This invention relates generally to deep well drilling apparatus and specifically to roller bits. It will be found particularly useful in cone bits.

The conventional cone bit includes a head having a plurality of spindles projecting downwardly and inwardly into a recess in its bottom. Upon these spindles are rotatably mounted substantially conical roller cutters.

This invention has for its principal object the provision of new and improved means whereby a roller cutter may be quickly and easily rotatably locked on a spindle.

Other objects will hereinafter appear.

The preferred embodiment of the invention is illustrated in the accompanying drawings in which Fig. 1 is a fragmentary sectional elevation illustrating the mounting of a cone cutter on the spindle of a bit; and Fig. 2 is a detailed view on the line 2—2 of Fig. 1.

In the drawings the bit head is indicated at 1. It has the usual shank 2 whereby it may be connected to the lower end of a conventional drill stem (not shown). In its lower end the bit head has a cutter recess 3 and projecting downwardly and inwardly into this recess is the cutter spindle 4. Rotatably mounted upon and enclosing the spindle 4 is the substantially conical cutter 5. The cutter is held on the spindle 4 by the pin 6 insertable in the bore 7 which extends upwardly and outwardly in the spindle 4 to the outside of the head, the end of the pin 6 being accessible from the exterior of the head so that it may be welded or otherwise secured in place as indicated at 8. The cutters roll upon the rolling bearings 9 disposed in the raceway 10 of the spindle 4.

Referring now to the means whereby the cutter 5 is rotatably connected to the pin 6 it will be observed that the inner end of the spindle 4 is reduced as indicated at 11. The pin 6 is provided with an annular flange 12 and the lower end of the pin extends into a recess 13 in the point portion of the cutter, suitable hard-surfacing material being inserted between the lower end of said pin and the point portion of the cutter as shown to resist the wear incident to the rotation of the cutter on the pin. Fitting between the annular flange 12 and the shoulder formed by the reduced lower end 11 of the spindle 4 to rotatably lock the cutter 5 on the spindle 4 is a ring 14 threaded in the cutter as shown. The internal diameter of this ring is substantially greater than the external diameter of the reduced end 11 of the spindle 4 so that when the rolling bearings 9 are worn in use this ring will sustain a portion of the radial load. The reduced end 11 of the spindle 4, and the shoulder formed by the reduction of the lower end of the spindle 4 may be hard-surfaced as shown.

In Fig. 2 it will be noted that the ring 14 is provided with oppositely disposed sockets 15 for the reception of a spanner wrench whereby the ring 14 may be screwed into the cutter 5.

The assembly of the parts above described may be effected as follows: The rolling bearings 9 having been placed in the raceways 10 of the spindle, and the pin 6 having been inserted in the cutter 5 and the ring 14 having been screwed into place, the cutter 5 may be placed on the spindle 4 and the pin 6 in the bore 7 of the spindle 4, after which the pin 6 may be welded, as indicated at 8, from the exterior of the head 1.

The invention is not limited to the specific embodiment herein disclosed. Changes within the scope of the following claims will occur to those skilled in the art.

We claim:

1. A roller bit comprising a head, said head having a downwardly and inwardly projecting spindle; said spindle having an axial bore extending upwardly and outwardly through said head and having a reduced inner end forming an annular shoulder; a substantially conical roller cutter on said spindle; a ring threaded in said cutter and surrounding said reduced end of said spindle; a pin secured in said bore and having an annular flange adjacent the inner side of said ring to rotatably lock said cutter on said spindle; and rolling bearings between said cutter and spindle to take the radial load; the internal diameter of said ring being somewhat larger than the external diameter of the reduced end of said spindle so that when said rolling bearings are worn said ring will sustain a part of the radial load.

2. A roller bit comprising a head, said head having a downwardly and inwardly projecting spindle; said spindle having an axial bore extending upwardly and outwardly through said head and having a reduced inner end forming an annular shoulder; a substantially conical roller cutter on said spindle; a ring threaded in said cutter and surrounding said reduced end of said spindle; and a pin secured in said bore and having an annular flange adjacent the inner side of said ring to rotatably lock said cutter on said spindle.

WILEY B. NOBLE.
WALTER C. FRANCIS.

REFERENCES CITED

The following references are of record in the file of this patent:

UNITED STATES PATENTS

| Number | Name | Date |
|---|---|---|
| 1,010,406 | Hughes | Nov. 28, 1911 |
| 1,990,007 | Sperry | Feb. 5, 1935 |
| 2,076,000 | Reed | Apr. 6, 1937 |
| 2,261,501 | Lore | Nov. 4, 1941 |